United States Patent
Reid et al.

(10) Patent No.: US 10,457,382 B2
(45) Date of Patent: Oct. 29, 2019

(54) SYSTEM AND METHOD FOR PROVIDING DYNAMIC TACTILE FEEDBACK TO A VEHICLE OPERATOR

(71) Applicant: The Boeing Company, Chicago, IL (US)

(72) Inventors: Katie M. Reid, Englewood, CO (US); Jason W. Clark, Evergreen, CO (US); Andres Chapiro Fermon, Boulder, CO (US)

(73) Assignee: THE BOEING COMPANY, Chicago, IL (US)

( * ) Notice: Subject to any disclaimer, the term of this patent is extended or adjusted under 35 U.S.C. 154(b) by 371 days.

(21) Appl. No.: 15/487,246

(22) Filed: Apr. 13, 2017

(65) Prior Publication Data

US 2018/0297690 A1   Oct. 18, 2018

(51) Int. Cl.
   *B64C 13/10*   (2006.01)
   *B64D 11/06*   (2006.01)

(52) U.S. Cl.
   CPC .......... *B64C 13/10* (2013.01); *B64D 11/0689* (2013.01)

(58) Field of Classification Search
   CPC ...... B64C 13/345; B64C 13/46; B64C 13/507
   USPC ....................................................... 244/223
   See application file for complete search history.

(56) References Cited

U.S. PATENT DOCUMENTS

| | | | |
|---|---|---|---|
| 5,746,392 A | 5/1998 | Gast | |
| 5,803,408 A | 9/1998 | Gast | |
| 5,836,546 A | 11/1998 | Gast | |
| 8,825,234 B2 | 9/2014 | Williams et al. | |
| 9,090,337 B2 * | 7/2015 | Tessier | B64C 13/04 |
| 9,703,476 B1 * | 7/2017 | Pappas | G06F 3/04847 |
| 2005/0080495 A1 * | 4/2005 | Tessier | B64C 13/04 700/63 |
| 2015/0212391 A1 * | 7/2015 | Waibel | G03B 15/006 701/2 |

* cited by examiner

*Primary Examiner* — J. Woodrow Eldred
(74) *Attorney, Agent, or Firm* — Toler Law Group, PC

(57) ABSTRACT

A system and method is disclosed for providing dynamic tactile feedback. A tactile feedback generator is mounted in each vehicle in a group of vehicles and is coupled to provide a controllable tactile feedback signal to an operator of each vehicle in the group of vehicles upon receipt of an activation signal. A tactile feedback control device is mounted in each vehicle in the group of vehicles and is coupled to the tactile feedback generator for selectively providing an activation signal and a tactile feedback characteristic signal thereto. An accelerometer is positioned within each vehicle in the group of vehicles. A turbulence processing unit is coupled to receive accelerometer data from each accelerometer. The turbulence processing unit processes the accelerometer data to identify characteristics of a current level of turbulence-induced vibration, and, based thereon, selects and provides updated tactile feedback characteristics to each tactile feedback control device.

20 Claims, 2 Drawing Sheets

SYSTEM AND METHOD FOR PROVIDING DYNAMIC TACTILE FEEDBACK TO A VEHICLE OPERATOR

FIELD

This disclosure relates generally to a system and method for providing tactile feedback to a vehicle operator and, more particularly, to providing dynamic tactile feedback to a vehicle operator that accounts for changing environmental conditions such as turbulence.

BACKGROUND

A "stick shaker" is a mechanical device that rapidly and noisily vibrates the control yoke of an aircraft to warn the pilot of an imminent flight issue such as a stall. These stick shaker devices are typically connected to the control column of most civil jet aircraft and large military aircraft. Warning systems that provide a tactile feedback signal via a stick shaker (or similar tactile feedback device) have been found quite effective in terms of pilot response time to a tactile feedback-based warning signal and thereby improving the pilot's situational awareness. When activated, the stick shaker devices vibrate at a fixed predetermined frequency. In some cases, however, the aircraft may experience turbulence that causes cockpit vibrations that mask the tactile feedback-based warning signal and thereby slow the pilot's response to such signal.

Accordingly, there is a need for a system and method providing tactile feedback which overcomes the problems caused by the aircraft turbulence.

SUMMARY

In a first aspect, a system is disclosed for providing dynamic tactile feedback to an operator of a vehicle. A tactile feedback generator is coupled to provide a controllable tactile feedback signal to an operator of a vehicle upon receipt of an activation signal. A tactile feedback control device is coupled to the tactile feedback generator for selectively providing an activation signal and a tactile feedback characteristic signal thereto. An accelerometer is positioned within the vehicle. A turbulence processing unit is coupled to receive accelerometer data from the accelerometer. The turbulence processing unit processes the accelerometer data to identify characteristics of a current level of turbulence-induced vibration, and, based thereon, selects and provides updated tactile feedback characteristics to the tactile feedback control device.

In a further embodiment, the vehicle may be an aircraft and the operator may be a flight crew member. The tactile feedback generator may be coupled to a control yoke to provide the controllable tactile feedback signal to the flight crew member. Alternatively, the tactile feedback generator may be coupled to a seat for the flight crew member to provide the controllable tactile feedback signal to the flight crew member. Further, the tactile feedback control device may adjust the tactile feedback characteristic signal based on a physiological characteristic of the flight crew member.

Still further, the turbulence processing unit may be mounted within the vehicle. Alternatively, the turbulence processing unit may be mounted remotely from the vehicle and may be coupled to the tactile feedback control device and the accelerometer via a wide area network.

In a second aspect, a system is disclosed for providing dynamic tactile feedback to operators of a group of vehicles. A tactile feedback generator is mounted in each vehicle in the group of vehicles and coupled to provide a controllable tactile feedback signal to an operator of each vehicle in the group of vehicles upon receipt of an activation signal. A tactile feedback control device is mounted in each vehicle in the group of vehicles and is coupled to the tactile feedback generator for selectively providing an activation signal and a tactile feedback characteristic signal thereto. An accelerometer is positioned within each vehicle in the group of vehicles. A turbulence processing unit is coupled to receive accelerometer data from each accelerometer. The turbulence processing unit processes the accelerometer data to identify characteristics of a current level of turbulence-induced vibration, and, based thereon, selects and provides updated tactile feedback characteristics to each tactile feedback control device.

In a further embodiment, each vehicle in the group of vehicles may be an aircraft and each operator may be a flight crew member. The tactile feedback generator in each aircraft may be coupled to a control yoke to provide the controllable tactile feedback signal to the associated flight crew member. Alternatively, the tactile feedback generator in each aircraft may be coupled to a seat for the flight crew member to provide the controllable tactile feedback signal to the associated flight crew member. Further, the tactile feedback control device in each aircraft may adjust the tactile feedback characteristic signal based on a physiological characteristic of the associated flight crew member.

In another further embodiment, each aircraft in the group of vehicles may be traversing the same route in a known order. Further, the turbulence processing unit may process only the accelerometer data from the accelerometer in an aircraft that is first in the known order to identify characteristics of a current level of turbulence-induced vibration. Still further, the turbulence processing unit may select and provide updated tactile feedback characteristics to each tactile feedback control device in each aircraft based on the characteristics of a currently level of turbulence-induced vibration identified only from the accelerometer in the aircraft that is the first in the known order.

Yet further, the turbulence processing unit may be mounted remotely from each vehicle in the group of vehicles and may be coupled to the tactile feedback control device and the accelerometer in each vehicle in the group of vehicles via a wide area network.

In a third aspect, a method for providing dynamic tactile feedback to an operator of a vehicle. First, accelerometer data is received from an accelerometer positioned within the vehicle. Next, a frequency of turbulence-induced vibration within the vehicle is determined. Further, updated tactile feedback characteristics that are different from the determined frequency of turbulence-induced vibration within the vehicle are selected. Finally, the selected updated tactile feedback characteristics are provided to a tactile feedback control device in the vehicle.

In a further embodiment, a tactile feedback signal based on the updated tactile feedback characteristics is selectively provided to an operator of a vehicle upon receipt of an activation signal from the tactile feedback control device.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
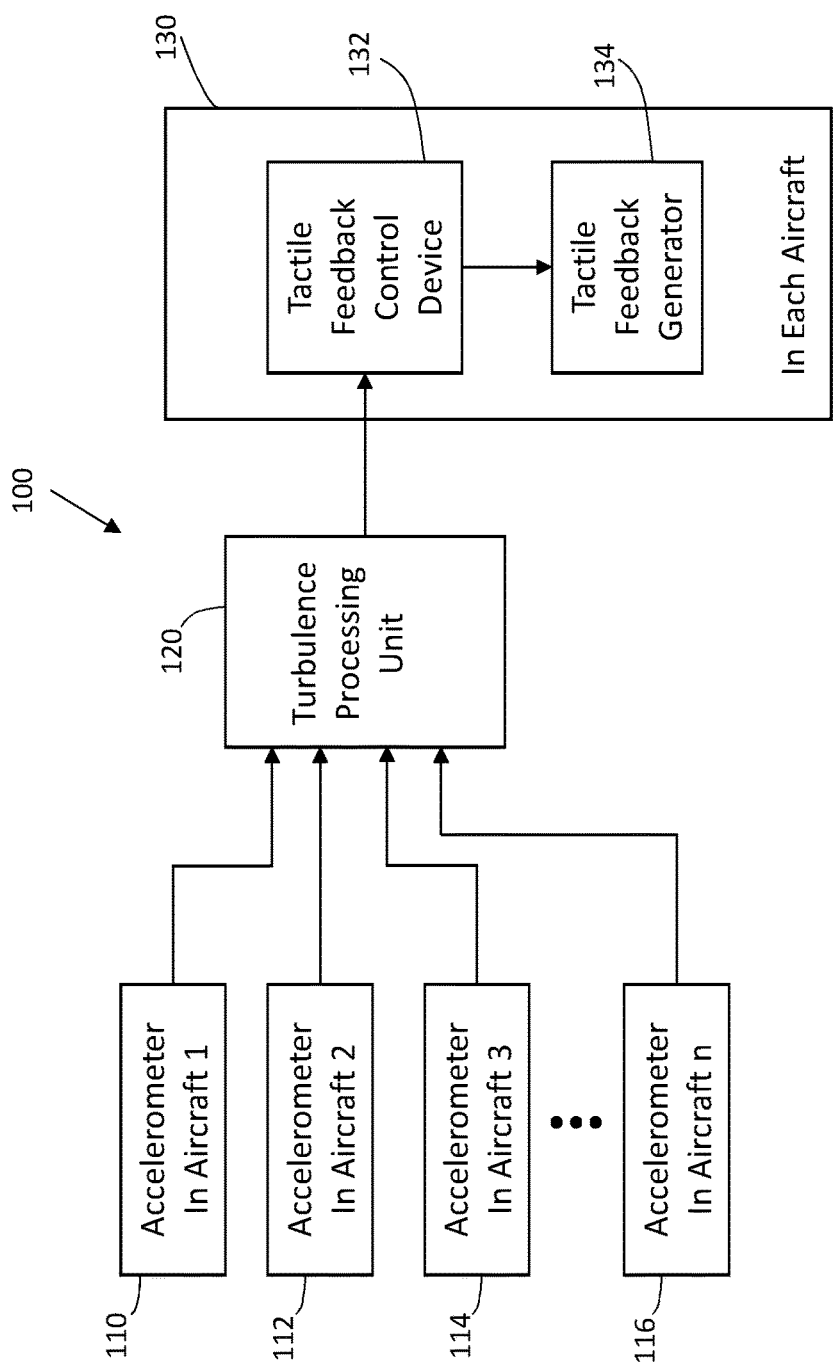
FIG. 1 is a block diagram of a dynamic tactile feedback-based warning system according to an embodiment of the present disclosure.

Referring now to FIG. 1, a system 100 for providing dynamic tactile feedback to a vehicle operator is shown in block diagram format. System 100 is shown in FIG. 1 implemented in an aircraft, however this system may be implemented in any vehicle which provides or could provide warning signals to an operator. Each aircraft 130 includes a tactile feedback control device 132 that is coupled to a tactile feedback generator 134. The tactile feedback control device 132 is coupled to control circuitry within aircraft 130 to receive a signal that indicates that a warning is to be provided to the flight crew (e.g., to the pilot and copilot). When such signal is received, tactile feedback control device 132 provides an activation signal to activate tactile feedback generator 134. Tactile feedback generator 134 produces tactile signals, e.g., vibrations on the control yoke, that can be sensed by the pilot. Tactile feedback control device 132 also controls the signal characteristics of the tactile feedback signals generated by tactile feedback generator 134, by providing a tactile feedback characteristic signal identifying, for example, the frequency, magnitude and form of such signals. The form may be, for example, sine wave, square wave or triangle wave. As will be seen, this provides the ability to set the characteristics of the tactile feedback signal to be different (such that it has a different frequency or magnitude, for example) from any vibrations in the cockpit caused by turbulence to provide a high signal to noise ratio for the tactile feedback signal over the turbulence-induced vibrations. Tactile feedback generator 134 may be, for example, a stick-shaker type device coupled to the control yoke for the pilot and co-pilot. Other types of tactile feedback may be implemented using system 100, including, for example, providing vibrations to a wristlet worn by the flight crew or to the seat of the pilot and copilot. In this latter case, tactile feedback control device 132 may include the capability to adjust the tactile feedback signals based on each flight crew member's physiology (e.g., weight and height) to optimize the transfer of such tactile feedback signals to the respective flight crew member.

The tactile feedback control device 132 in each aircraft 130 is coupled to a turbulence processing unit 120. In a first embodiment, the turbulence processing unit 120 may be present in each aircraft 130 or may be mounted remotely and is also coupled to a single accelerometer (e.g., accelerometer 110) present in aircraft 130. In a second embodiment, the turbulence processing unit 120 is at a remote, land-based location and is coupled to each tactile feedback control device 132 via a wide-area network type connection (e.g., unit 120 is "cloud-based"). In this second embodiment, the accelerometers 110, 112, 114, 116 are also coupled to the turbulence processing unit 120 via the same wide-area network type connection. The accelerometers 110, 112, 114, 116 may be dedicated sensors installed in the aircraft or may be existing sensors included within devices coupled to the aircraft systems (e.g., a phone or tablet).

Each accelerometer 110, 112, 114, 116 provides data to the turbulence processing unit 120 that is representative of the current level of turbulence of each respective aircraft. This is useful, for example, when the accelerometers 110, 112, 114, 116 are each installed in respective aircraft traversing along the same route or in a queue for landing at the same airport. Turbulence processing unit 120 receives the data from each of the accelerometers 110, 112, 114, 116 and, processes that data to identify characteristics of a current level of turbulence-induced vibration. Then, based on the relative positioning of each respective aircraft, turbulence processing unit 120 may predict the turbulence to be experienced by the aircraft during landing based on the actual turbulence experienced by the first aircraft in the queue. Based on the experienced (for the first aircraft in the queue) or predicted (for each subsequent aircraft in the queue) turbulence, turbulence processing unit 120 dynamically selects characteristics (e.g., frequency and magnitude) for the tactile feedback signal that are significantly different from the identified characteristics of the turbulence-induced vibration and supplies updated tactile feedback characteristics to tactile feedback control device 132 in each aircraft 130 in the queue. The selected characteristics are chosen to be different from the experienced or predicted turbulence-caused flight deck vibrations, significantly increasing the signal to noise ratio between the tactile feedback signal and the turbulence-induced vibrations in the cockpit. By ensuring that the tactile feedback signals are different from (e.g., asynchronous to) the experienced or predicted turbulence-caused flight deck vibrations, system 100 ensures that the flight crew is able to maintain situational awareness and to quickly and accurately identify the presence of a tactile feedback warning signal regardless of the current level of turbulence and associated cockpit vibration. In addition, when the turbulence processing unit 120 is cloud-based and receives live turbulence data from other aircraft on the same route, system 100 provides a predictive turbulence evaluation in view of preceding aircraft, ensuring that the selected tactile feedback characteristics are appropriate for the turbulence to be experienced during the course of the flight.

Figure 2:
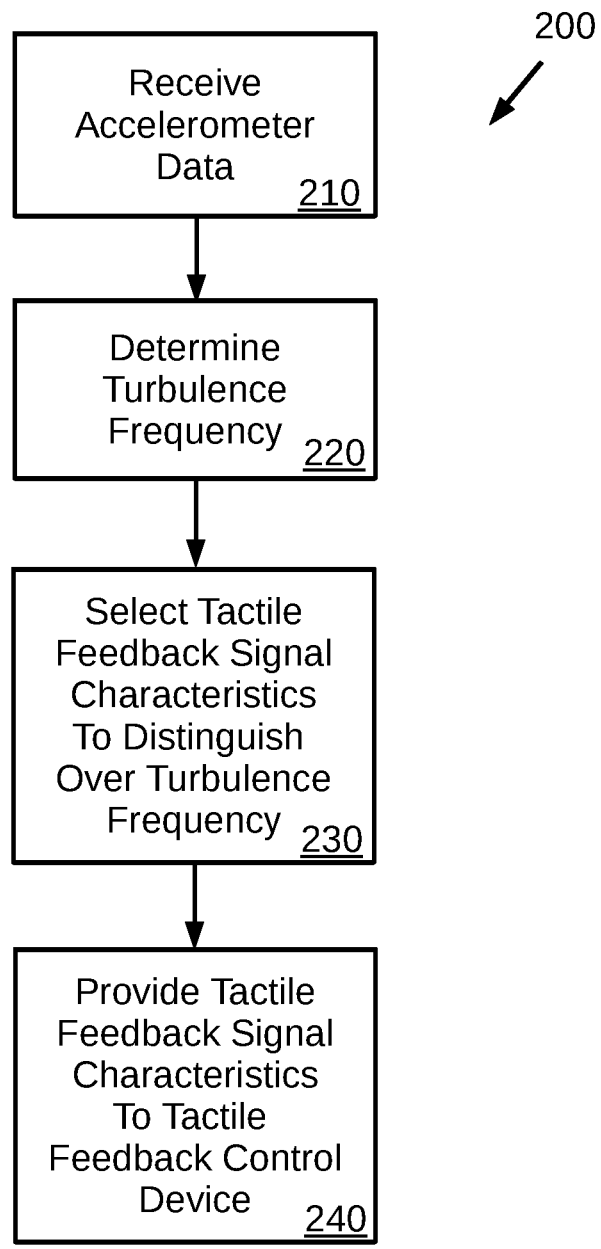
FIG. 2 is a flowchart of a dynamic tactile feedback-based warning system according to an embodiment of the present disclosure.

Referring now to FIG. 2, a flow chart 200 is shown of a method for providing dynamic tactile feedback to a vehicle operator. In a first step 210, accelerometer data is received from an accelerometer mounted in one or more vehicles. This accelerometer data may be only for a single vehicle or for a group of vehicles traversing a common route. Based on the accelerometer data, the frequency of turbulence-induced vibration within the vehicle is determined at step 220. Thereafter, at step 230, tactile feedback signal characteristics are chosen to distinguish over the determined frequency of turbulence-induced vibration. Finally, at step 240, the selected tactile feedback signal characteristics are provided to the tactile feedback control device in each vehicle.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for providing dynamic tactile feedback to an operator of a vehicle, comprising:

a tactile feedback generator coupled to provide a controllable tactile feedback signal to an operator of a vehicle upon receipt of an activation signal;

a tactile feedback control device coupled to the tactile feedback generator for selectively providing an activation signal and a tactile feedback characteristic signal thereto;

an accelerometer positioned within the vehicle; and a turbulence processing unit coupled to receive accelerometer data from the accelerometer, the turbulence processing unit processing the accelerometer data to identify characteristics of a current level of turbulence-induced vibration, and, based thereon, selecting and providing updated tactile feedback characteristics to the tactile feedback control device.

2. The system of claim 1, wherein the vehicle is an aircraft and the operator is a flight crew member.

3. The system of claim 2, wherein the tactile feedback generator is coupled to a control yoke to provide the controllable tactile feedback signal to the flight crew member.

4. The system of claim 2, wherein the tactile feedback generator is coupled to a seat for the flight crew member to provide the controllable tactile feedback signal to the flight crew member.

5. The system of claim 4, wherein the tactile feedback control device adjusts the tactile feedback characteristic signal based on a physiological characteristic of the flight crew member.

6. The system of claim 1, wherein the turbulence processing unit is mounted within the vehicle.

7. The system of claim 3, wherein tactile feedback control device adjusts the tactile feedback characteristic signal to have a different frequency or magnitude from current level of turbulence-induced vibration in the cockpit as determined from the accelerometer data, to provide a high signal to noise ratio for the tactile feedback signal over the turbulence-induced vibrations.

8. The system of claim 7, wherein the turbulence processing unit is coupled to the tactile feedback control device and the accelerometer via a wide area network.

9. A system for providing dynamic tactile feedback to operators of a group of vehicles, comprising:

a tactile feedback generator mounted in each vehicle in the group of vehicles and coupled to provide a controllable tactile feedback signal to an operator of each vehicle in the group of vehicles upon receipt of an activation signal;

a tactile feedback control device mounted in each vehicle in the group of vehicles and coupled to the tactile feedback generator for selectively providing an activation signal and a tactile feedback characteristic signal thereto;

an accelerometer positioned within each vehicle in the group of vehicles; and a turbulence processing unit coupled to receive accelerometer data from each accelerometer, the turbulence processing unit processing the accelerometer data to identify characteristics of a current level of turbulence-induced vibration, and, based thereon, selecting and providing updated tactile feedback characteristics to each tactile feedback control device.

10. The system of claim 9, wherein each vehicle in the group of vehicles is an aircraft and each operator is a flight crew member.

11. The system of claim 10, wherein the tactile feedback generator in each aircraft is coupled to a control yoke to provide the controllable tactile feedback signal to the associated flight crew member.

12. The system of claim 10, wherein the tactile feedback generator in each aircraft is coupled to a seat for the flight crew member to provide the controllable tactile feedback signal to the associated flight crew member.

13. The system of claim 12, wherein the tactile feedback control device in each aircraft adjusts the tactile feedback characteristic signal based on a physiological characteristic of the associated flight crew member.

14. The system of claim 10, wherein each aircraft in the group of vehicles is traversing the same route in a known order.

15. The system of claim 14, wherein the turbulence processing unit processes only the accelerometer data from the accelerometer in an aircraft that is first in the known order to identify characteristics of a current level of turbulence-induced vibration.

16. The system of claim 15, wherein the turbulence processing unit selects and provides updated tactile feedback characteristics to each tactile feedback control device in each aircraft based on the characteristics of a currently level of turbulence-induced vibration identified only from the accelerometer in the aircraft that is the first in the known order.

17. The system of claim 9, wherein the turbulence processing unit is mounted remotely from each vehicle in the group of vehicles.

18. The system of claim 17, wherein the turbulence processing unit is coupled to the tactile feedback control device and the accelerometer in each vehicle in the group of vehicles via a wide area network.

19. A method for providing dynamic tactile feedback to an operator of a vehicle, comprising the steps of:

receiving accelerometer data from an accelerometer positioned within the vehicle;

determining a frequency of turbulence-induced vibration within the vehicle;

selecting updated tactile feedback characteristics that are different from the determined frequency of turbulence-induced vibration within the vehicle; and providing the selected updated tactile feedback characteristics to a tactile feedback control device in the vehicle.

20. The method of claim 19, further comprising the step of selectively providing a tactile feedback signal based on the updated tactile feedback characteristics to an operator of a vehicle upon receipt of an activation signal from the tactile feedback control device.

* * * * *